(12) United States Patent
Klein

(10) Patent No.: US 7,515,509 B2
(45) Date of Patent: Apr. 7, 2009

(54) TEACHING CLOCK

(76) Inventor: Jennifer Klein, 11515 77 Avenue, Edmonton, AL (CA) T6G 0M2

( * ) Notice: Subject to any disclaimer, the term of this patent is extended or adjusted under 35 U.S.C. 154(b) by 0 days.

(21) Appl. No.: 11/608,434

(22) Filed: Dec. 8, 2006

(65) Prior Publication Data

US 2008/0138782 A1 Jun. 12, 2008

(51) Int. Cl.
*G04B 19/00* (2006.01)
(52) U.S. Cl. .................... 368/223; 368/229
(58) Field of Classification Search ............. 368/223
See application file for complete search history.

(56) References Cited

U.S. PATENT DOCUMENTS

| | | | | |
|---|---|---|---|---|
| 5,253,228 A | * | 10/1993 | Truett | 368/82 |
| 5,526,327 A | * | 6/1996 | Cordova, Jr. | 368/223 |
| 5,863,205 A | | 1/1999 | Martens | |
| 6,071,124 A | | 6/2000 | Ang et al. | |
| 6,198,698 B1 | * | 3/2001 | Graves | 368/223 |
| 6,361,325 B1 | | 3/2002 | McGuire | |
| 6,449,219 B1 | * | 9/2002 | Hepp et al. | 368/239 |
| 6,614,727 B2 | | 9/2003 | McGuire | |
| 6,962,494 B1 | * | 11/2005 | Olson | 368/63 |
| 2006/0133215 A1 | * | 6/2006 | Gordon et al. | 368/79 |
| 2007/0070822 A1 | * | 3/2007 | Booty et al. | 368/223 |

\* cited by examiner

*Primary Examiner*—Renee S Luebke
*Assistant Examiner*—Jason Collins
(74) *Attorney, Agent, or Firm*—Calfee, Halter & Griswold LLP

(57) ABSTRACT

A children's clock comprising a housing, at least one clock display on the housing for displaying time and illustration means for visually illustrating the continuous passage of time to a child who cannot read time. The illustration means is on the housing and is synchronized with the at least one clock display. The clock helps a child to learn concepts of time by providing them with an identifiable visual image to illustrate the continuous passage of time.

19 Claims, 4 Drawing Sheets

8:03

Little hand points to 8

1 2 3 4 5 6 7 8 z z Z Z Z

TEACHING CLOCK

FIELD OF THE INVENTION

The present invention relates to a clock for teaching a child to learn concepts of time.

BACKGROUND OF THE INVENTION

An understanding of the concepts of time is very important to a child's independence and development. Most young children, especially those around the toddler age, do not comprehend concepts of time such as the passing of time or how to determine how much time is left before a certain activity will occur. Without understanding concepts of time and being able to read a clock, a child must rely on routine or instructions from a parent to know when they are supposed to sleep, when they get out of bed in the morning, when they should brush their teeth and so on. Teaching a child to learn these concepts can be quite a significant task even when a child is old enough to be able to read numbers on a digital or analog display.

U.S. Pat. No. 6,361,325 (McGuire) discloses a children's sleeptime timer and clock device having a digital clock and/or an analog clock. The device also includes a display wheel having at least two two-dimensional illustrations which are alternately shown during sleep times and awake times. This device is intended to visually inform the child when they should be asleep and when they should be awake. It is in essence a visual alarm clock as the change from the sleep time illustration to the awake time illustration is done in a step-wise fashion and a child will not gain much of an understanding of the passage of time or how much time is left from using this device. U.S. Pat. No. 6,614,727, also to McGuire, discloses a similar device where the illustration is three-dimensional.

Various other children's clocks have been designed which incorporate synchronized analog and digital clocks (for example, U.S. Pat. No. 5,863,205 and U.S. Pat. No. 6,071,124). These clocks are intended for children who can already read digital time and do not assist in teaching a child concepts of time such as the passing of time or how to determine how much time is left before a certain activity will occur.

Embodiments of the present invention provide a children's clock having analog and/or digital displays and means for visually illustrating the continuous passage of time and the time left before an event occurs. The means for visually illustrating the continuous passage of time or the time left is an identifiable visual aid for the child which assists in teaching concepts of time.

SUMMARY OF THE INVENTION

In accordance with an embodiment of the present invention there is provided a children's clock comprising a housing, at least one clock display on the housing for displaying time and illustration means for visually and progressively illustrating the continuous passage of time to a child who cannot read time. The illustration means is on the housing and is synchronized with the clock display.

With this construction of clock, a child is provided with an identifiable visual image illustrating the continuous passage of time which is intended to assist in teaching concepts of time to a child. By providing the clock in a fun and interactive package that the child can identify with, the child is also provided with motivation to learn concepts of time.

BRIEF DESCRIPTION OF THE DRAWINGS

These and other advantages of the invention will become apparent upon reading the following detailed description and upon referring to the drawings in which.

Figure 1:
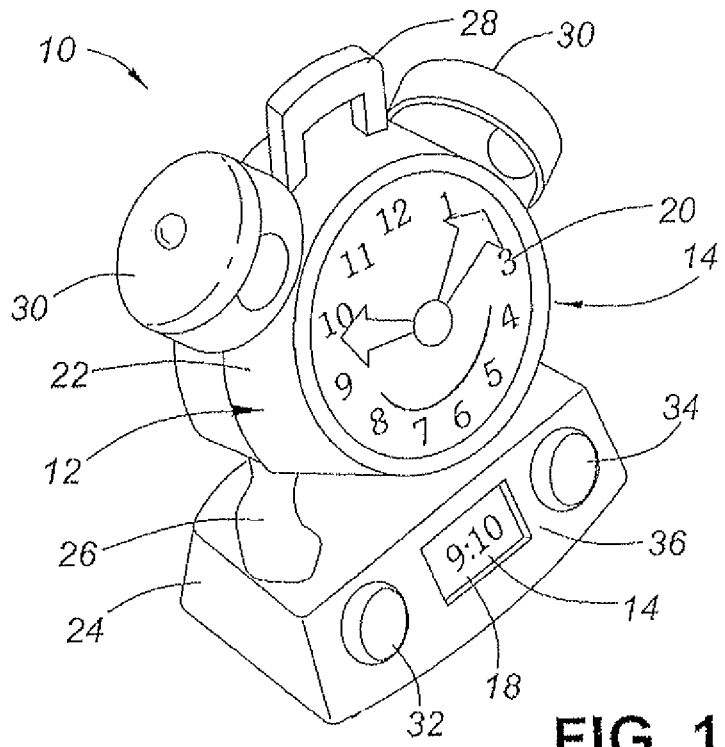
FIG. 1 is a perspective view of a children's clock in accordance with an embodiment of the invention.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given identical reference numerals where appropriate.

Figure 2:
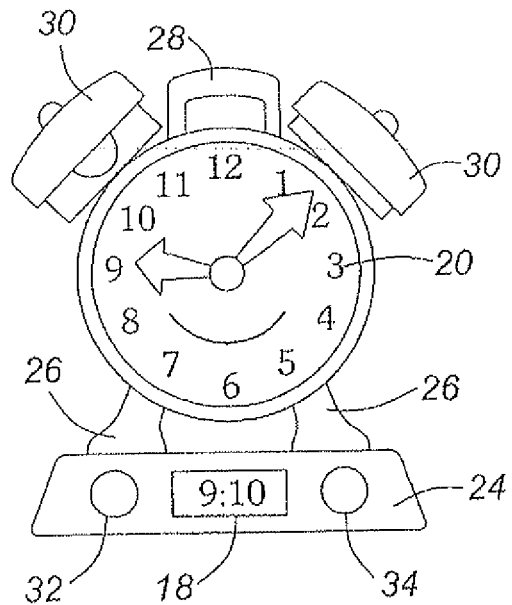
FIG. 2 is a front view of the clock of FIG. 1, with one eye in an open position and the other eye in a closed position.
Figure 3:
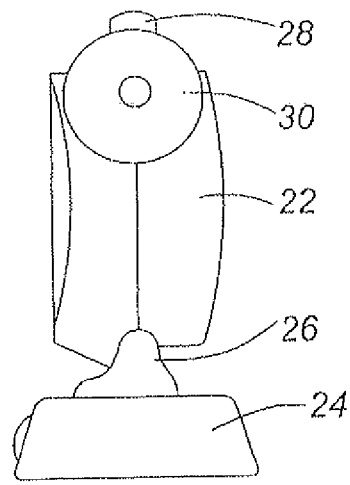
FIG. 3 is a side view of the clock of FIG. 1.

FIGS. 1, 2 and 3 illustrate a children's clock 10 comprising a housing 12, at least one clock display 14 on the housing for displaying time and illustration means for visually illustrating the continuous passage of time to a child who cannot read time. The illustration means is synchronized with the at least one clock display 14 and may be displayed on the housing 12. It should be noted that the illustration means is not displayed by the clock 10 in the state of the clock 10 shown in FIGS. 1, 2, 3, but will be described in more detail later in this description.

The clock 10 illustrated in FIG. 1 has both a digital clock display 18 for displaying time in digital format and an analog clock display 20 for displaying time in analog format. It should of course be understood that the clock 10 may have one or more digital clocks 18 and no analog clock(s) 20 or, alternatively, may have one or more analog clocks 20 and no digital clock 18. Where both analog clock(s) 20 and digital clock(s) 18 are provided on the clock 10, they are to be synchronized.

The clock 10 has a main body 22 and a base 24. The analog clock display 20 may be on the main body 22 and the digital clock display 18 may be on the base 24, as shown in FIGS. 1, 2 and 3. The main body 22 may be supported by a plurality of supports 26. Further, the main body 22 may have a handle 28 so that a child may carry the clock 10 around like a toy.

The appearance of the clock 10 may be designed to appeal to children as this will motivate them to want to learn from the device. For example, the supports 26 may be shaped like legs, the main body may be designed to look like a face, and a pair of eyes 30, "open" (FIG. 1) when a preset time is reached, and closed before that time, may be provided on an upper portion of the main body. The eyes 30 may be shaped like alarm bells (as on a traditional bell-type alarm clock). Preferably the clock 10 is of a robust construction so that a child may carry it around without damaging it.

Figure 4:
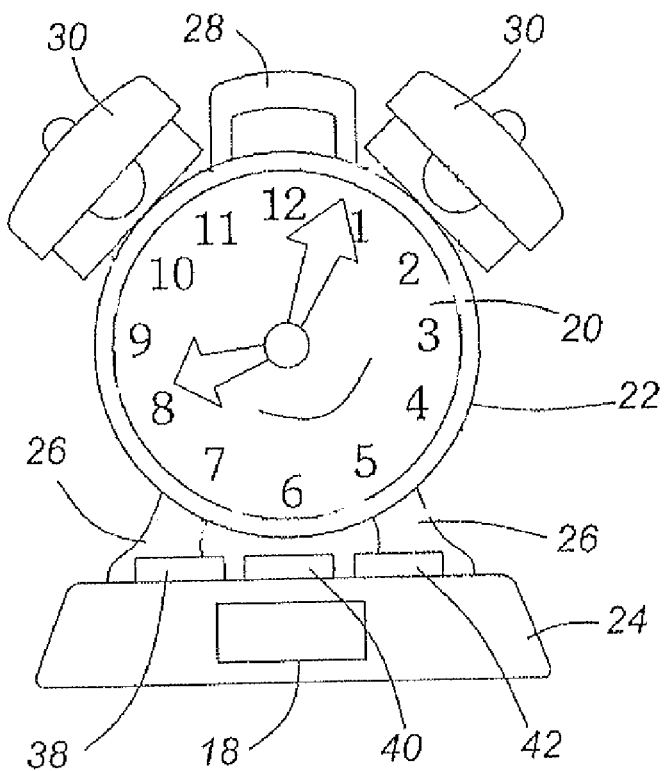
FIG. 4 is a front view of a children's clock in accordance with an embodiment of the invention.
Figure 5:
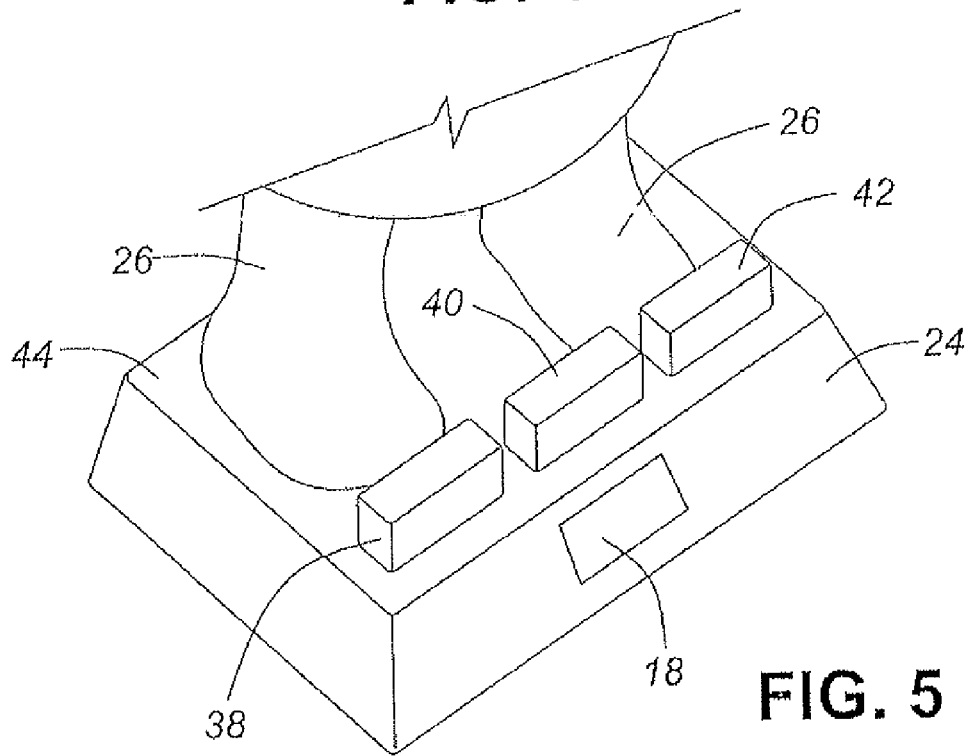
FIG. 5 is a perspective view of an alternative embodiment of the base of the clock of FIG. 1.

Buttons 32 and 34, as shown in FIGS. 1 and 2, may be provided on a side portion 36 the base 24 for on-command audio and visual stimuli which will be described in more detail later on. Alternatively or additionally, buttons 38, 40 and 42 may be provided on a top portion 44 of the base 24, as shown in FIG. 4 and 5. The buttons 32, 34, 38, 40 and 42 may also be used to play games. For example, when a particular one of the buttons is pressed, a voice may ask 'what is this' and display a picture on the screen which is associated with the current time (e.g. a toothbrush may be displayed before bedtime). The child may subsequently press a second button to obtain the answer. Any suitable game may be incorporated into the clock 10, particularly time-related games.

The analog clock display 20 may be an LCD screen. Of course, any shape of LCD screen may be used, but currently, square or rectangular panels are lowest in cost. Similarly, the digital clock display 18 may be an LCD screen. It should be understood, however, that any suitable type of display may be used for the clock displays 14.

Figure 6:
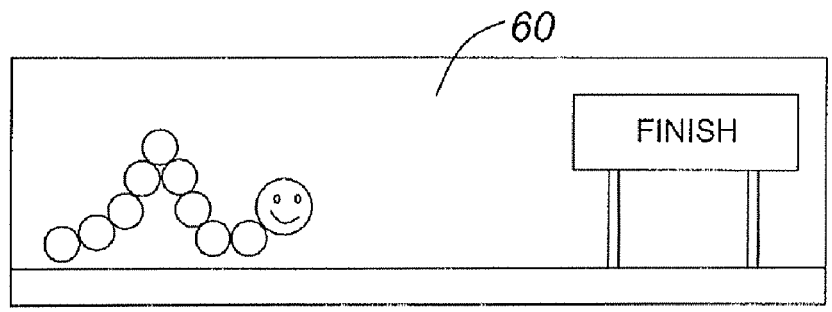
FIG. 6 is a screenshot of an LCD screen showing an animation to illustrate the continuous passage of time.
Figure 7:
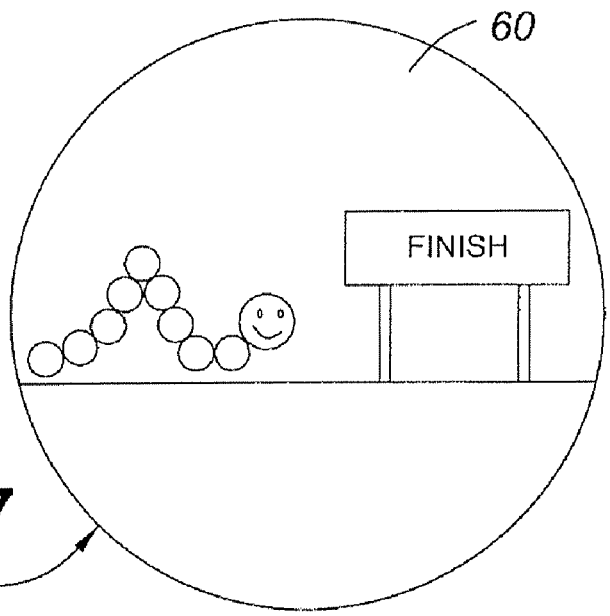
FIG. 7 is a screenshot of the LCD screen of FIG. 4 showing an animation to illustrate the continuous passage of time.

The illustration means may be displayed on the LCD screen of the analog clock display 20 or the LCD screen of the digital clock display 18 (or both). Referring now to FIGS. 6 and 7, the illustration means 58 may be an animation 60 progressively representing visually the amount of time left before a preset time for example for a particular event (such as getting out of bed) is to occur. For example, the animation 60 may show an inch worm crawling across the screen to a finish line, (representative of the precise, pre-ordained time to get out of bed) as shown. This arrangement is particularly well suited to children who have developed cognitively to the point they can anticipate. Alternatively, the animation 60 may show a cup filling up with water or an hourglass. Whatever the animation 60, the intent is to present an identifiable image or metaphor to a child which illustrates the passage of time ending in the occurrence of an event. The illustration means 58 could also be a flashing picture which is alternated with an image of the clock.

The illustration means may be displayed continuously (e.g. over a 24 hour period) or for some discrete amount of time (e.g. for one hour before the child is supposed to get out of bed).

Where the illustration means 58 is an animation, the analog clock display 20 or the digital clock display 18 may be hidden while the animation is shown. Alternatively, the illustration means 58 may be incorporated into the display of the clock. For example, the illustration means 58 may comprise changing the colour of a portion of the analog clock display 20, for example the portion behind one or both of the clock hands, the portion with the changed colour progressively expanding, to illustrate what time has passed and what time has yet to pass before the selected time for the event.

Figure 8:
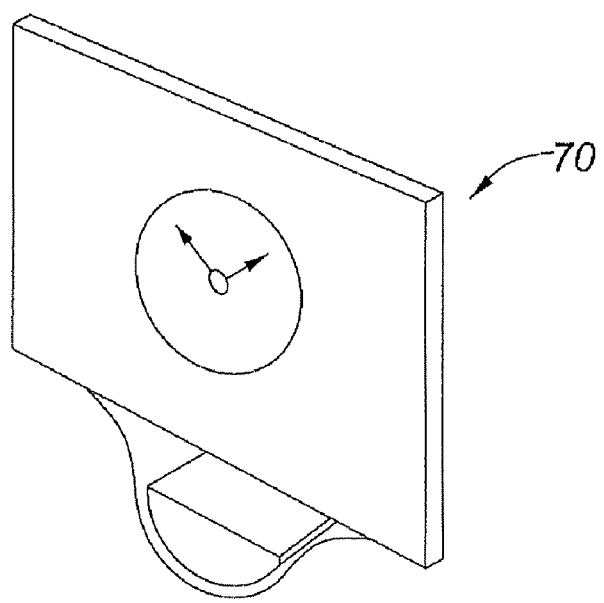
FIG. 8 illustrates a set of childproof controls for the clock of the present invention.

The clock 10 may further comprise an alarm. The alarm may be operable to provide visual cueing means and/or audio cueing means. The alarm may provide the visual and/or audio cueing means at one or more preset times. The at least one preset time of the alarm may be set by using a covered child-proof set of controls 70 on a back side of the housing 12 (FIG. 8). Multiple controls may be provided to set multiple preset times for the alarm(s).

The illustration means and the alarm may be integrated so that the illustration means is displayed for a predetermined time before the preset time of the alarm. For example, referring back to FIGS. 6 and 7, the animation may be set to commence an hour before the child is permitted to get out of bed and the inch worm may get to the finish line at the time the child is permitted to get out of bed. In such a case, the visual cueing means would be part of the animation (e.g. the inch worm could dance around at the finish line to indicate to the child that it is time to get up).

The visual cueing means may comprise movement of the eyes 30. More specifically, the eyes 30 may be operable to move from a closed position to an open position when the alarm is activated at the present time. In FIG. 2, the left eye is shown in an open position and the right eye is shown in a closed position. Alternatively, the visual cueing means may comprise means for changing the face of the analog clock display 20 or the digital clock display 18 from one colour to another colour when the alarm is activated. This can be accomplished easily where the analog clock display 20 and/or digital clock display 18 is an LCD screen.

The preset time(s) of the alarm may determine awake times and asleep times for the child. In embodiments of the invention where the visual cueing means comprises movement of the eyes 30, the eyes 30 may be in an open position during awake times and in a closed position during asleep times.

The audio cueing means may comprise at least one speaker for producing a sound. The sound produced may be any suitable sound, such as classical music.

Figures 9A, 9B, 9C, 9D:
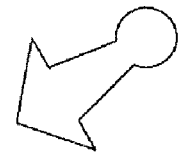
FIG. 9A is a screenshot of the first LCD screen showing the time in digital format.
FIG. 9B is a screenshot of the LCD screen of FIG. 9A showing an explanation of the analog time.
FIG. 9C is a screenshot of the LCD screen of FIG. 9A showing numbers associated with the current time.
FIG. 9D is a screenshot of the LCD screen of FIG. 9A indicating sleep time.

Referring now to FIGS. 9A, 9B, 9C and 9D, digital display 18 may be used to display various visual cues and instructions to the child. For example, in normal operation as shown in FIG. 9A, the digital display 18 may show the time in digital format. For children who are old enough to read, the digital display 18 may provide an explanation of the analog time, such as the phrase 'Little hand points to 8' as shown in FIG. 9B, or '1 2 3 4 5 6 7 8' (with the number corresponding to the current hour accented), as shown in FIG. 9C, to assist them in learning to read the analog clock display 20. The digital clock display 18 may also display an image associated with the child's current activity, such as 'zzzzzzz', as shown in FIG. 9D, to illustrate that it is currently time to be sleeping.

The clock 10 may further comprise means for providing an on-command audio and/or visual stimulus. The means for providing an on-command audio stimulus may be a speaker (or a plurality of speakers) and may be activated by pressing a button, such as button 32. The on-command audio stimulus may be a voice saying the current time. The on-command visual stimulus may be activated by pressing one of the buttons, such as button 42, which may be used to start an animation, such as the inch worm animation described previously.

Thus, it is apparent that there has been provided in accordance with the invention a children's clock that fully satisfy the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The invention claimed is:

1. A children's clock comprising:

a housing;

at least one clock display on the housing for displaying time; and an illustration means for visually and progressively illustrating the continuous passage of time to a child who cannot read time, wherein the illustration means is on the housing and is synchronized with the at least one clock display, and wherein the illustration means comprises an identifiable visual image that is displayed in addition to the at least one clock display for a predetermined time before at least one preset time and progressively represents visually the amount of time left before the preset time; and wherein the illustration means is displayed independently of the at least one clock display and comprises an animation, and wherein the animation presents one of an identifiable image and an identifiable metaphor to a child that illustrates the passage of time ending in an occurrence of an event corresponding to the preset time.

2. The clock of claim 1, wherein the at least one clock display comprises at least one of a digital clock display for displaying time in digital format and an analog clock display for displaying time in analog format.

3. The clock of claim 1, wherein the at least one clock display comprises a digital clock display for displaying time in digital format and an analog clock display for displaying time in analog format, the analog clock display being synchronized with the digital clock display.

4. The clock of claim 3, wherein the housing comprises a main body and a base, the analog clock display being on the main body and the digital clock display being on the base.

5. The clock of claim 1, wherein the illustration means is displayed on an LCD screen.

6. The clock of claim 1, wherein the at least one clock display comprises an LCD screen.

7. The clock of claim 1, further comprising an alarm, the alarm being operable to provide at least one of visual cueing means and audio cueing means at at least one preset time.

8. The clock of claim 7, wherein the at least one preset time is preset by a covered child-proof set of controls.

9. The clock of claim 7, wherein the visual cueing means comprises a pair of eyes mounted on a portion of the housing, the eyes being operable to move from a closed position to an open position when the alarm is activated.

10. The clock of claim 9 wherein the at least one preset time determines awake times and asleep times for the child and the pair of eyes is in the open position during awake times and in the closed position during asleep times.

11. The clock of claim 7, wherein the visual cueing means comprises means for changing the clock display from one color to another color when the alarm is activated.

12. The clock of claim 7, wherein the audio cueing means comprises at least one speaker for producing a sound.

13. The clock of claim 1, further comprising means for providing an on-command audio stimulus.

14. The clock of claim 13, wherein the means for providing an on-command audio stimulus is activated by a push button.

15. The clock of claim 13, wherein the on-command audio stimulus is a voice saying the current time.

16. The clock of claim 1, further comprising a plurality of buttons, wherein a first button is configured to, when actuated, cause the clock to pose a question and display on the at least one clock display an image corresponding to the current time, and wherein a second button is configured to, when actuated, cause the clock to provide an answer to the question.

17. The clock of claim 1 wherein at the preset time a visual cue is displayed as part of the animation to indicate to the child that it is time to get up.

18. A children's clock comprising:

a housing;

at least one clock display on the housing for displaying time; and an illustration means for visually and progressively illustrating the continuous passage of time to a child who cannot read time, wherein the illustration means is on the housing and is synchronized with the at least one clock display, and wherein the illustration means comprises an identifiable visual image that is displayed in addition to the at least one clock display for a predetermined time before at least one preset time and progressively represents visually the amount of time left before the preset time; and wherein the illustration means comprises a progressively expanding portion of a changed color on the at least one clock display.

19. A children's clock comprising:

a housing;

at least one clock display on the housing for displaying time; and an illustration means for visually and progressively illustrating the continuous passage of time to a child who cannot read time, wherein the illustration means is on the housing and is synchronized with the at least one clock display, and wherein the illustration means comprises an identifiable visual image that is displayed in addition to the at least one clock display for a predetermined time before at least one preset time and progressively represents visually the amount of time left before the preset time; and further comprising a plurality of buttons, wherein a first button is configured to, when actuated, cause the clock to pose a question and display on the at least one clock display an image corresponding to the current time, and wherein a second button is configured to, when actuated, cause the clock to provide an answer to the question.

* * * * *